United States Patent
Ciavatta et al.

(10) Patent No.: US 10,259,173 B2
(45) Date of Patent: Apr. 16, 2019

(54) SHEET MOULDING COMPOUND

(75) Inventors: Gabriele Ciavatta, Rome (IT); Mauri Feltrin, Nanto (IT)

(73) Assignee: CAMPAGNOLO S.R.L., Vicenza (IT)

( * ) Notice: Subject to any disclaimer, the term of this patent is extended or adjusted under 35 U.S.C. 154(b) by 988 days.

(21) Appl. No.: 12/603,201

(22) Filed: Oct. 21, 2009

(65) Prior Publication Data

US 2010/0104847 A1    Apr. 29, 2010

(30) Foreign Application Priority Data

Oct. 23, 2008  (EP) .................................... 08425687

(51) Int. Cl.
   *B32B 27/04*    (2006.01)
   *B26D 7/00*     (2006.01)
   (Continued)

(52) U.S. Cl.
   CPC .............. *B29C 70/14* (2013.01); *B29C 70/18* (2013.01); *B29C 70/50* (2013.01);
   (Continued)

(58) Field of Classification Search
   CPC ......... B29C 70/14; B29C 70/15; B29C 70/50; B29C 70/18; B29K 2105/06;
   (Continued)

(56) References Cited

U.S. PATENT DOCUMENTS 5,234,259 A * 8/1993 Nishimuro ................ B60B 5/02
                                                301/11.1
5,273,819 A * 12/1993 Jex .......................... B29C 70/14
                                                264/172.11
(Continued)

FOREIGN PATENT DOCUMENTS

CN       1724307 A    1/2006
EP       0415436      3/1991
(Continued)

OTHER PUBLICATIONS

European Office Action for Appln. No. 08 425 687.4-1253, dated May 7, 2012.
(Continued)

*Primary Examiner* — Camie S Thompson
(74) *Attorney, Agent, or Firm* — Volpe and Koenig, P.C.

(57) ABSTRACT

A sheet compound (1) is disclosed, comprising a first group of conglomerates (3) of fiber segments (5) and a matrix (6) of polymeric material, the conglomerates (3) of the first group having a random orientation, and at least one second group of conglomerates (4) of fiber segments (5) and a matrix (6) of polymeric material, the conglomerates (4) of the second group having a prevailing orientation of a direction of maximum tensile strength (FR) thereof along a respective predetermined direction (FB) in said geometric plane (P), said at least one second group of conglomerates (4) being distinguishable from the first group of conglomerates (3) by at least one characteristic other than orientation. A process and an installation for making such a material, as well as a molded object made from such a material are also disclosed.

15 Claims, 10 Drawing Sheets

(51) Int. Cl.
*B65H 29/26* (2006.01)
*B32B 7/02* (2006.01)
*B29C 70/14* (2006.01)
*B29C 70/18* (2006.01)
*B29C 70/50* (2006.01)

(52) U.S. Cl.
CPC ........ *Y10T 83/0448* (2015.04); *Y10T 83/2092* (2015.04); *Y10T 428/24994* (2015.04)

(58) Field of Classification Search
CPC ............. B29K 2105/12; B29L 2009/00; B29L 2031/3091; Y10T 428/24124; Y10T 428/24994; Y10T 428/249949; Y10T 428/254; Y10T 428/24058; Y10T 428/24074; Y10T 428/24132; Y10T 74/2164; B32B 27/00; B32B 27/04; B32B 27/02; B32B 27/18; B26D 7/00; B65H 29/26; C08K 7/02; C08K 7/18; B60B 5/02; B62M 3/00; B62K 19/16; C08J 5/042
USPC ....... 428/297.4, 300.4, 327, 108, 114, 299.1, 428/332, 323; 74/594.1; 264/177.2; 301/11.1, 96.102, 95.107, 64.701
See application file for complete search history.

(56) References Cited

U.S. PATENT DOCUMENTS

2005/0013984 A1   1/2005  Dijk et al.
2005/0062337 A1*  3/2005  Meggiolan et al. ..... 301/95.102
2005/0199092 A1*  9/2005  Feltrin et al. ................ 74/594.1

FOREIGN PATENT DOCUMENTS

| | | |
|---|---|---|
| EP | 0916477 | 5/1999 |
| EP | 1134314 | 9/2001 |
| TW | 511406 B | 11/2002 |
| WO | 2004030906 | 4/2004 |

OTHER PUBLICATIONS

English translation of Taiwanese Office Action dated May 20, 2014 in corresponding TW Patent Application No. 098135820.

* cited by examiner

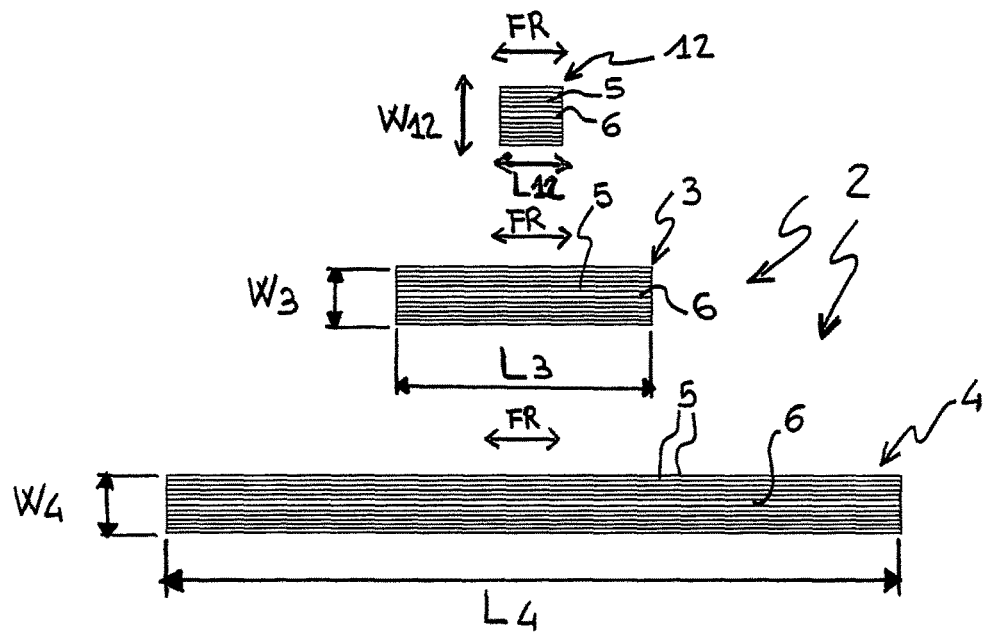
Fig. 2
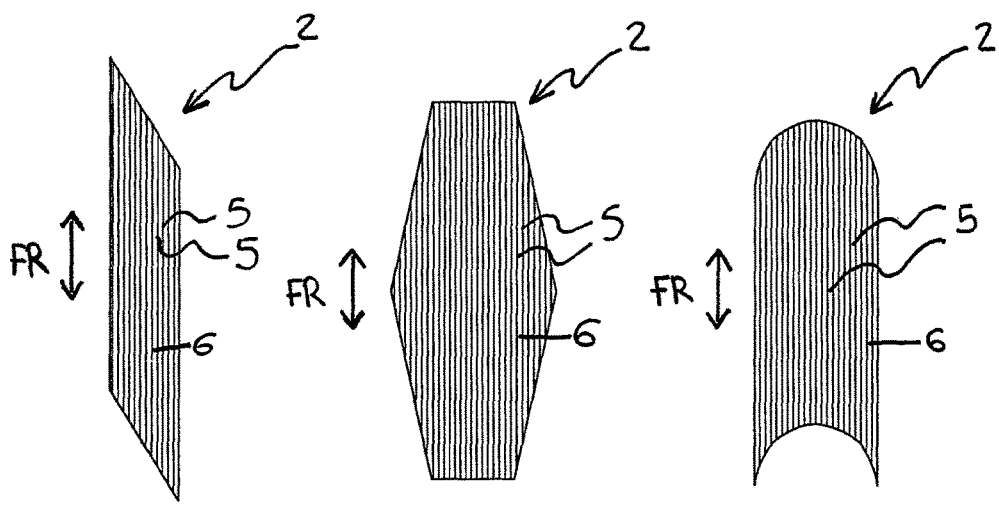
Fig. 3  Fig. 4  Fig. 5

SHEET MOULDING COMPOUND

FIELD OF INVENTION

The present invention concerns the field of sheet compounds. Such materials are generally known in the field as Sheet Moulding Compounds.

BACKGROUND

Although there may be more limiting definitions of such a term, in the present description and in the attached claims, under "sheet moulding compound" a material is meant to be broadly indicated having one dimension much smaller than the other two, comprising reinforcing fibres of varying nature as better specified hereinbelow and a matrix of at least one polymeric material, as better specified hereinbelow. In other words, the expression should neither be interpreted in the limiting sense to include specific fibres, specific matrix resins, nor to necessarily require or, vice-versa, to exclude the presence of fillers, like for example fillers of the resin, binders and other additives, or of a support or layer of a different composition.

Moulding compounds are known and comprise structural fibres, for example of carbon, incorporated in a matrix of polymeric material.

Sheet moulding compounds of unidirectional or woven fibre allow good control of the characteristics of mechanical strength along the critical directions of the object to be moulded, but their use does not allow good filling of the mould. On the other hand, moulding compounds comprising loose fibres allow good filling of the mould, but do not allow good control of the local density of the fibres and of their orientation in the moulded object.

In order to avoid this, moulding compounds are known comprising conglomerates—substantially two-dimensional patches or three-dimensional pieces—of fibre segments, within which the segments of fibre are usually arranged one parallel to the other or also according to a woven structure.

Compounds with conglomerates of fibre segments are particularly suitable for compression moulding since they and their fibre segments are able to flow in the mould when their matrix of polymeric material is in viscous state, improving the filling of the mould even in the case of complex shapes. The shapes and sizes of the conglomerates are selected according to the shape and size of the piece to be made, allowing reasonable control of the direction of the fibres and therefore of the characteristics of mechanical strength along the various directions.

EP 0 916 477 A1 discloses a moulding compound in the form of a three-dimensional bar, wherein the patches of unidirectional fibres can be oriented according to one or more preferential directions. The Applicant observes that, due to the three-dimensional flow of the patches, the surface finish of the pieces obtained from such a compound is very poor, since it suffers from delamination. The Applicant also observes that the control of the three-dimensional orientation of the patches is difficult to obtain in practice. Moreover, the starting orientation of the fibres is made fruitless during moulding by their flowing, thus obtaining moulded components without definite mechanical characteristics.

EP 0 415 436 A1 discloses a sheet moulding compound comprising patches of unidirectional fibre randomly arranged or, alternatively, arranged substantially in the same direction in the plane of the sheet.

WO 2004/030906 A1 discloses a sheet moulding compound comprising patches of unidirectional fibre arranged according to interpenetrating layers. According to the document, an object to be moulded can comprise patches of a range of shapes and sizes randomly distributed over its surface, or patches of a particular shape or size may be positioned or oriented in particular locations on the object, so as to provide localised areas having specific strength characteristics, such as local anisotropy. The Applicant observes that making a moulded object according to the teachings of such a document is particularly burdensome since it is necessary to precisely control the location of the anisotropic areas and such a position can be altered due to the flow of the patches, thus jeopardising the ability to obtain the expected mechanical characteristics.

Therefore, there is still the need for a sheet moulding compound that allows moulded objects having good mechanical characteristics to be made simply.

In particular, the technical problem at the basis of the present invention is to provide a sheet moulding compound that allows good filling of the mould even in the case of complex shapes, and that provides sufficient characteristics of mechanical tensile strength in every direction.

SUMMARY

The disclosure is directed to a sheet compound having a width and a length defining a geometric plane and a negligible thickness compared to the width and the length. The sheet compound comprises a first group of conglomerates of fibre segments and a matrix of polymeric material. The conglomerates of the first group have a random orientation of a direction of maximum tensile strength thereof in the geometric plane. The sheet compound also comprises at least one second group of conglomerates of fibre segments and a matrix of polymeric material. The conglomerates of the second group have a prevailing orientation of a direction of maximum tensile strength thereof along a respective predetermined direction in the geometric plane. The at least one second group of conglomerates is distinguishable from the first group of conglomerates by at least one characteristic other than orientation.

BRIEF DESCRIPTION OF THE DRAWINGS

Further characteristics and advantages of the present invention shall become clearer from the following detailed description of some preferred embodiments thereof, made with reference to the attached drawings. In the drawings:

FIG. 2 shows constituent conglomerates of the material of FIG. 1,

FIGS. 3 to 5 shows alternative constituent conglomerates of the material of FIG. 1.

DETAILED DESCRIPTION OF THE PREFERRED EMBODIMENTS

Introduction to the Embodiments

Figure 1:
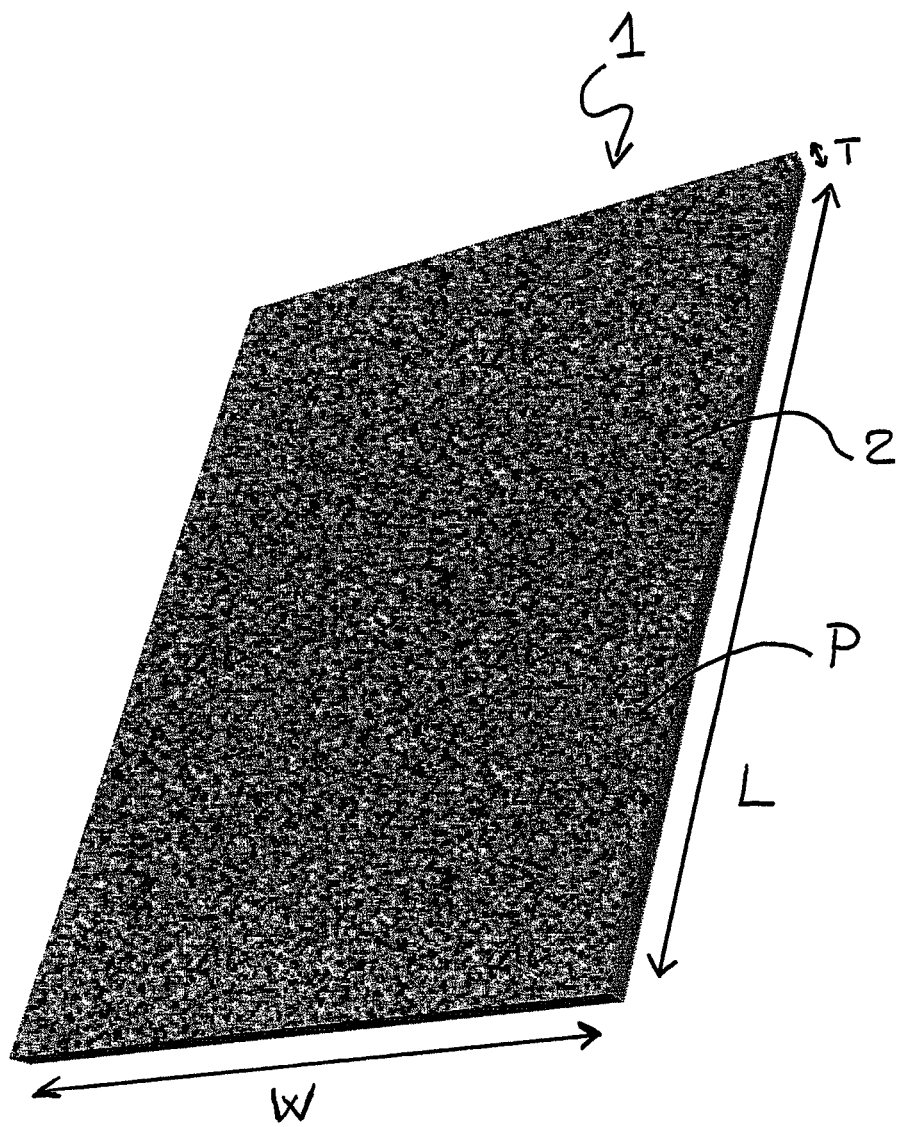
FIG. 1 shows a sheet moulding compound according to the invention.

In a first aspect thereof, the invention concerns a sheet compound having a width and a length defining a geometric plane and a negligible thickness compared to the width and the length, comprising:
- a first group of conglomerates of fibre segments and a matrix of polymeric material, the conglomerates of the first group having a random orientation of a direction of maximum tensile strength thereof in said geometric plane, and
- at least one second group of conglomerates of fibre segments and a matrix of polymeric material, the conglomerates of the second group having a prevailing orientation of a direction of maximum tensile strength thereof along a respective predetermined direction in said geometric plane, said at least one second group of conglomerates being distinguishable from the first group of conglomerates by at least one characteristic other than orientation.

In the present description and in the attached claims, the terms "width and length" should not be taken in the limiting sense to exclude a square shape of the sheet compound, although it is preferably rectangular and even more preferably in the form of a rollable band.

In the present description and in the attached claims, under "prevailing orientation" it is meant to indicate that the conglomerates of the second group are all oriented (apart from manufacturing tolerances) with their direction of maximum tensile strength extending according to a direction that falls within a predetermined angular range with respect to the predetermined direction. The predetermined angular range is preferably ±40°, even more preferably ±30°.

Thanks to the conglomerate structure, the sheet moulding compound of the invention allows a good degree of filling of the mould. The first group of conglomerates provides the sheet moulding compound of the invention with a non-zero mechanical tensile strength in any direction in the plane of the sheet moulding compound. The second group of conglomerates, on the other hand, provides the sheet moulding compound of the invention with a high mechanical tensile strength in the direction of the prevailing orientation. The sheet moulding compound of the invention is therefore particularly suitable for making moulded objects subjected to prevailingly oriented loads, since the Applicant has recognised that in such objects there is still a need for minimum and definite strength also in the other directions, since the main load usually also divides into smaller components in the other directions. Moreover, the sheet moulding compound of the invention is particularly suitable for making moulded objects since in such objects, when put into use, local concentrations of tensions are created, which are not foreseen at the time of design, which normally considers in a simplified way only theoretical nominal loads.

The conglomerates can comprise woven fibre, but preferably the conglomerates comprise fibre segments parallel to one another, since the Applicant has recognised that such a configuration of the conglomerates allows greater filling of the mould.

Preferably, said at least one characteristic of distinguishability of the conglomerates of the second group compared to the conglomerates of the first group is selected from the group consisting of:
- nature of the fibre,
- shape of the conglomerates,
- size of the conglomerates,
- arrangement of the fibre segments within the conglomerates, and
- the fact that they are arranged in different layers parallel to the geometric plane.

Preferably, the density of the conglomerates of the first group is greater than and even more preferably twice the density of the conglomerates of the second group.

As stated, the conglomerates of the first and second groups can be arranged in superimposed layers, namely there is a separating plane between the conglomerates of the first group and the conglomerates of the second group, but preferably the conglomerates of the first and second groups are arranged in interpenetrating layers.

The conglomerates can be small three-dimensional pieces, but preferably they are substantially two-dimensional.

The conglomerates can be of any shape, but preferably they are rectangular.

Preferably, the first group comprises comparatively short conglomerates and the second group comprises comparatively long conglomerates.

In the present description and in the subsequent claims, all of the numerical magnitudes indicating amounts, parameters, percentages, and so on should be meant as to be preceded in all circumstances by the term "about" unless otherwise indicated. Moreover, all of the ranges of numerical magnitudes include all of the possible combinations of maximum and minimum numerical values and all of the possible intermediate ranges, besides those specifically indicated thereafter.

Preferably, the conglomerates of the first group have a length/width ratio of less than or equal to 6.5/1, more preferably less than or equal to 5/1.

Preferably the conglomerates of the second group have a length/width ratio of less than or equal to 20/1, more preferably less than or equal to 12.5/1.

Preferably, the conglomerates of the first group have a length within the range 0.5-110 mm, more preferably 0.5-50 mm, even more preferably 30-45 mm.

Preferably, the conglomerates of the second group have a length within the range 30-150 mm, more preferably 100-150 mm, even more preferably 105-120 mm.

Preferably, the width of the conglomerates is within the range 2-50 mm, more preferably 5-20 mm even more preferably 6-10 mm.

Preferably, the sheet moulding compound further comprises a third group of conglomerates of fibre segments and a matrix of polymeric material, the conglomerates of the third group having a random orientation of a direction of maximum tensile strength thereof in said geometric plane and being distinguishable from the first group of conglomerates by at least one characteristic other than orientation.

Preferably, the conglomerates of the third group have a length/width ratio of less than or equal to 2/1, more preferably equal to 1/1.

Preferably, the conglomerates of the third group have a length and a width within the range 2-40 mm, more preferably 6-10 mm.

In a second aspect, the invention concerns an object moulded from a sheet moulding compound according to what has been outlined.

Preferably the moulded object has an elongated shape and the conglomerates of the second group are prevailingly oriented with their direction of maximum tensile strength according to the longitudinal direction of the object.

Preferably, the moulded object is a bicycle component.

More preferably, the moulded object is a crank.

In a third aspect thereof, the invention concerns a process for making a sheet moulding compound, comprising the steps of:

a) providing at least one base material comprising fibre and matrix of polymeric material, b) cutting a first group of conglomerates and at least one second group of conglomerates from said at least one base material, and c) arranging on a plane the conglomerates of the first group with random orientation of a direction of maximum tensile strength thereof, and the conglomerates of said at least one second group with prevailing orientation of a direction of maximum tensile strength thereof along a respective predetermined direction.

Preferably, said step a) comprises providing at least one sheet of base material comprising unidirectional fibre and a matrix of polymeric material.

Preferably, the process further comprises the steps of:

d) cutting a third group of conglomerates from said at least one sheet of base material, and e) randomly arranging the conglomerates of the third group.

Advantageously, the process further comprises, before the cutting step b), a step of cooling the base material until the substantial disappearance of tack.

Preferably, said cooling step comprises cooling down to a temperature $T \leq 0°$ C., more preferably $T \leq -10°$ C., and even more preferably $T \leq -15°$ C.

The process can further comprise, before the cutting step b), a step of detaching a support sheet from the base material.

In order to remove the excess humidity that may have accumulated the process can further comprise a step of drying the arrangement of conglomerates.

The process can further comprise a step of laminating at least one additional layer to the arrangement of conglomerates.

Preferably, in the lamination step said at least one additional layer is selected from the group consisting of a layer of material of unidirectional fibre and a matrix of polymeric material, and a layer of polymeric material, preferably the same as the polymeric material of the matrix of the conglomerates.

The process preferably further comprises a step of applying pressure to the arrangement of conglomerates to compact the conglomerates together down to a predetermined thickness.

Preferably, said step of applying pressure comprises additionally applying heat.

The process preferably further comprises a step of cutting the sheet moulding compound longitudinally at the edges.

The process preferably further comprises a step of rolling the sheet moulding compound for storage.

Alternatively, the process further comprises a step of cutting the sheet moulding compound transversally, to obtain sheets of sheet moulding compound that can be stored in stacks.

In order to prevent premature curing of the matrix of polymeric material, the process preferably further comprises a step of cooling the arrangement of conglomerates to a temperature below room temperature.

Preferably the cutting step b) comprises making first longitudinal cuts so as to provide strips, and transversal cuts of the strips to obtain said conglomerates.

More preferably, the cutting step b) comprises making first longitudinal cuts so as to provide strips, and cyclically making second and third transversal cuts, respectively, of the strips at a first and second distance, respectively, from the end of the strip that is currently free to obtain said conglomerates of the first and second group, respectively.

Even more preferably, in said cutting step b), said first distance is shorter than said second distance.

Preferably, in said cutting step b), each cycle provides for two cuts at said first distance and one cut at said second distance.

Advantageously, said arrangement step c) comprises letting the conglomerates fall on the plane from at least one falling height onto a mobile support.

Preferably, the process also provides for the step of adjusting the falling height.

Preferably, the process further provides for the step of adjusting the speed of motion of the mobile support.

In a fourth aspect thereof, the invention concerns an installation for making a sheet moulding compound, comprising:

a station for feeding at least one base material comprising fibre and a matrix of polymeric material, a cutting station arranged to make cuts of said at least one base material into at least conglomerates of a first group and conglomerates of a second group, at least one mobile plane at a falling height below the cutting station, said cutting station and said at least one mobile plane being configured to arrange the conglomerates of the first group with random orientation of a direction of maximum tensile strength thereof, and the conglomerates of said at least one second group with prevailing orientation of a direction of maximum tensile strength thereof along a respective predetermined direction onto said at least one mobile plane.

Preferably, said cutting station comprises a first plurality of blades to make first cuts of the base material so as to provide strips, and at least one second blade to cyclically make second and third transversal cuts, respectively, of the strips at a first and a second distance, respectively, from the end of the strip that is currently free to obtain said conglomerates of the first and second group, respectively.

Preferably, said second blade is controlled to make said second transversal cuts at a first distance shorter than said second distance.

More preferably, said second blade is controlled to make cutting cycles each comprising two cuts at said first distance and one cut at said second distance.

Preferably, moreover, said at least one mobile plane comprises a first conveyor belt arranged at a first falling height below the cutting station, and a second conveyor belt arranged at a second falling height below the first conveyor belt.

Preferably, the first falling height is less than or equal to 100 cm.

Preferably, moreover, the second falling height is between 5 and 50 cm.

In order to change the falling heights, preferably said first conveyor belt is supported at an adjustable height in the installation.

More preferably, said first conveyor belt is supported with an adjustable slope in the installation.

Preferably, moreover, the speed of said at least one conveyor belt is adjustable.

Said at least one conveyor belt can further be mobile with reciprocating motion.

The installation can further comprise, upstream of said cutting station, a cooling station.

Preferably, said cooling station is arranged to cool down to a temperature $T\leq 0°$ C., more preferably $T\leq -10°$ C., and even more preferably $T\leq -15°$ C.

Preferably, said installation further comprises a drier.

Typically, said installation further comprises a calender.

Typically, moreover, the calender is heated.

The installation can further comprise a lamination station of at least one additional layer onto said arrangement of conglomerates.

The installation can further comprise a device for controlling the filling of the plane with the conglomerates.

Preferably, the control device comprises an array of photoelectric cells arranged transversally to said at least one mobile plane and/or an array of load cells.

Typically, the installation further comprises a finishing station, in which the longitudinal edges of the sheet moulding compound are cut and it is possibly cut to size.

DETAILED DESCRIPTION

FIG. 1 shows a sheet moulding compound 1 according to the present invention.

In the embodiment shown in FIG. 1, the sheet moulding compound 1 is in the form of a discrete sheet, of length L and width W. However a sheet moulding compound in the form of a continuous band is also within the scope of the invention. Moreover, the width W and length L size are average size since, as shall be better understood hereinafter, the edges of the sheet moulding compound are not neat edges unless they are cut.

Although the sheet moulding compound 1 has a finite thickness T, such a thickness T is of negligible size compared to the width W and length L sizes, for which reason hereinafter reference shall briefly be made to the plane P of the sheet moulding compound 1, under what the geometric plane defined by width W and length L is meant. For example, the thickness T can be between 0.5 and 5 mm, while the width W can be between 100 and 1000 mm.

The sheet moulding compound 1 comprises a plurality of conglomerates 2. Each conglomerate 2 comprises segments of structural fibre and a matrix of polymeric material.

With reference to FIG. 2, each conglomerate 2 is preferably flat in shape and comprises segments 5 of structural fibre arranged substantially unidirectionally and embedded in a matrix 6 of polymeric material.

Each conglomerate 2 can however be three-dimensional, for example of cylindrical or parallelepiped or cubic shape, comprising several layers of segments of unidirectional fibre and possibly also non-parallel segments of fibre. The Applicant has nevertheless observed that substantially flat conglomerates 2 promote matching to complex-shaped moulds.

Still alternatively, each conglomerate 2 can be made of woven fibre, of the biaxial type, i.e. comprising segments of warp fibre and segments of weft fibre, or of the multi-axial type, i.e. with fibres arranged parallel to more than two axes.

The structural fibres are preferably selected from the group consisting of carbon fibres, glass fibres, aramid fibres, ceramic fibres, boron fibres and combinations thereof. Carbon fibres are particularly preferred.

The polymeric matrix material of the conglomerates 2 is preferably thermosetting and more preferably comprises an epoxy resin. The epoxy resin is preferably in a state of partial curing. However a polymeric matrix material of the thermoplastic type, wherein the matrices of adjacent conglomerates are joined together through melting and re-solidification, is within the scope of the invention.

The conglomerates 2 are preferably of rectangular or in particular square shape, as shown in FIG. 2. The conglomerates 2 may however not be rectangular in shape. Just as an example, in FIGS. 3 to 5 some shapes are shown that have the advantage, like the rectangular or square shape, of being able to be obtained from a sheet of unidirectional or woven fibre and polymeric matrix material through multiple cuts, without material waste.

Figure 6:
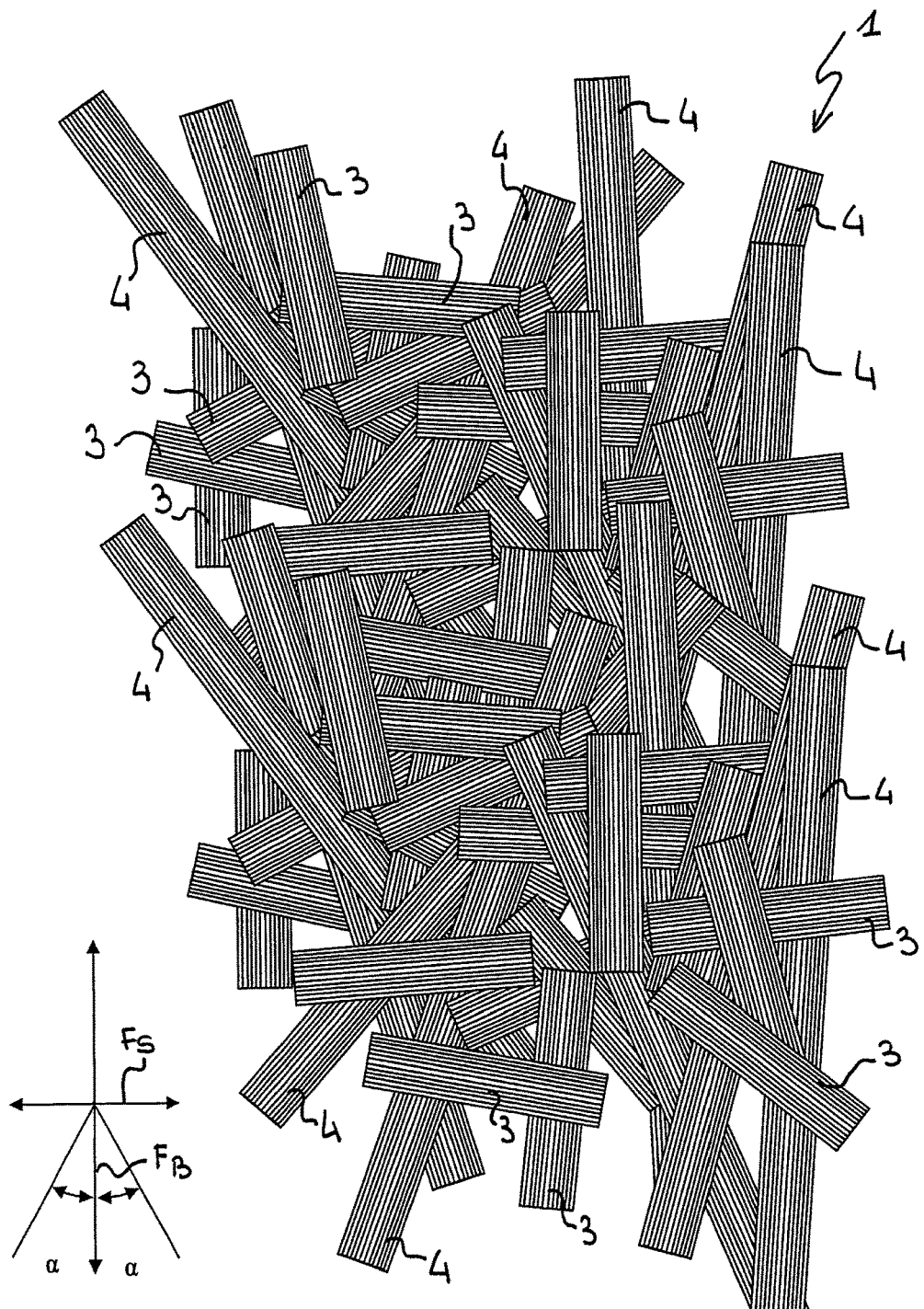
FIG. 6 shows a detail of a sheet moulding compound according to a first embodiment of the present invention, in a plan view.
Figure 7:
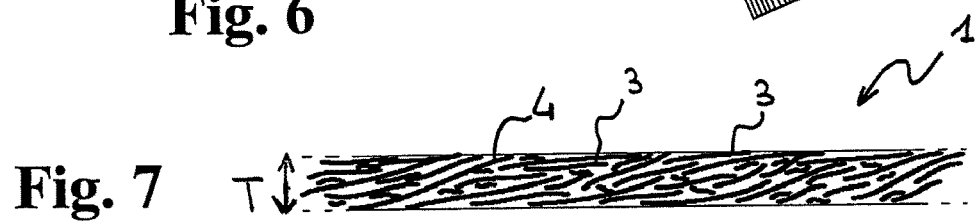
FIG. 7 is a longitudinal section view through the material of FIG. 6.

With reference to FIGS. 2, 6 and 7, a sheet moulding compound 1 according to a first embodiment of the present invention comprises a first group of conglomerates 3 and a second group of conglomerates 4.

The conglomerates 3 of the first group and the conglomerates 4 of the second group have the same rectangular shape, but they differ in length, which in the case of unidirectional fibre coincides with the length of their segments 5. The conglomerates 3 of the first group are shorter than the conglomerates 4 of the second group.

The conglomerates 3 of the first group have a length L3 preferably within the range 0.5-110 mm, more preferably 0.5-50 mm, even more preferably 30-45 mm. In one embodiment the length L3 is 40 mm.

The conglomerates 4 of the second group, on the other hand, have a length L4 preferably within the range 30-150 mm, more preferably 100-150 mm, even more preferably 105-120 mm. In one embodiment the length L4 is 110 mm.

Preferably, the width W3 and W4 of the conglomerates 3 and 4 is the same and within the range 2-50 mm, more preferably 5-20 mm, even more preferably 6-10 mm. In one embodiment the widths W3 and W4 are 8 mm.

In terms of ratio between length and width, for the conglomerates 3 of the first group this is preferably $L3/W3\leq 6.5/1$, more preferably $L3/W3\leq 5/1$, while for the conglomerates 4 preferably $L4/W4\leq 20/1$, more preferably $L4/W4\leq 12.5/1$.

The conglomerates 3 of the first group and the conglomerates 4 of the second group have a different arrangement in the plane of the sheet moulding compound 1.

The conglomerates 3 of the first group have a substantially random orientation.

The conglomerates 3 of the first group, due to their random distribution in the plane of the sheet moulding compound 1, globally provide a certain mechanical tensile strength, comparatively low but not negligible, in every direction of the plane P of the sheet moulding compound 1.

The conglomerates 4 of the second group, on the other hand, have a prevailing orientation of their direction FR of maximum tensile strength along the direction FB, namely they are oriented with their direction FR according to a direction that falls within a predetermined angular range±α with respect to the direction FB. The predetermined angular range±α is preferably ±40°, even more preferably ±30°. It should be understood that, in practice, a small number of conglomerates 4 of the second group may not fall within the predetermined angular range±α, without for this reason departing from the scope of protection of the present invention.

In the case of unidirectional fibre, the direction FR of maximum tensile strength extends according to the direction of the fibres that, in the cases shown in FIGS. 2 to 5, coincides with the length direction L of the sheet moulding compound 1.

In the case of woven fibre, the direction FR of maximum tensile strength depends, besides upon the cutting of the conglomerates, also upon the type of weaving. Each conglomerate could also have more than one direction of maximum tensile strength FR. In this case, according to the invention the conglomerates 4 of the second group will have a prevailing orientation of one of such directions of maximum strength according to the direction FB, and a consequent prevailing orientation of the other—or of each other—direction of maximum tensile strength according to a second direction.

The conglomerates 4 of the second group, due to their distribution prevailingly oriented in the plane of the sheet moulding compound 1, globally provide a high mechanical strength along the direction FB, preferably extending along the length direction L of the sheet moulding compound 1 and, depending on the magnitude of the angular range±α, also contribute to provide a certain mechanical strength along the direction FS perpendicular to the direction FB and preferably extending along the width direction W of the sheet moulding compound 1.

The sheet moulding compound 1 of FIG. 6 is therefore, overall, anisotropic and has a high mechanical tensile strength in the direction FB, but also a good mechanical tensile strength in the direction FS.

Although the greater length of the conglomerates 4 of the second group compared to the conglomerates 3 of the first group further promotes anisotropy being obtained, the conglomerates 3, 4 of the two groups could be the same length.

The two groups of conglomerates 3, 4 can, as an alternative or in addition to the distinction in terms of size L3, W3 and L4, W4, be distinguishable by one or more other properties. In particular, the conglomerates 3, 4 can be distinguishable by the nature of the fibres: for example the conglomerates 3 can comprise carbon fibres and the conglomerates 4 can comprise glass fibres or vice-versa. Furthermore, the conglomerates 3, 4 can be distinguishable by shape, between the rectangular shape and the shapes shown in FIGS. 3 to 5 and others. Furthermore, the conglomerates 3, 4 can be distinguishable by the arrangement of the fibre segments within them: for example the conglomerates 3 can comprise woven fibre and the conglomerates 4 can comprise unidirectional fibre or vice-versa.

Moreover, the conglomerates 3 and 4 can be distinguishable by density. Preferably, the density of the conglomerates 3 of the first group is greater than the density of the conglomerates 4 of the second group, even more preferably it is twice, as shown in FIGS. 6 and 7.

The conglomerates 3, 4 could also be distinguishable by the nature of the polymeric matrix material, provided that they are compatible as curing profile and capable of co-reticulating.

With reference to FIG. 7, it should be noted that the conglomerates 3 and 4 of the first and second group are arranged according to interpenetrating layers, namely there is no separating plane between the conglomerates 3 of the first group and the conglomerates 4 of the second group, and they form substantially a single layer. This arrangement has the further advantage of providing a good resistance against delamination in an object moulded from the sheet moulding compound 1 of the invention.

Figure 8:
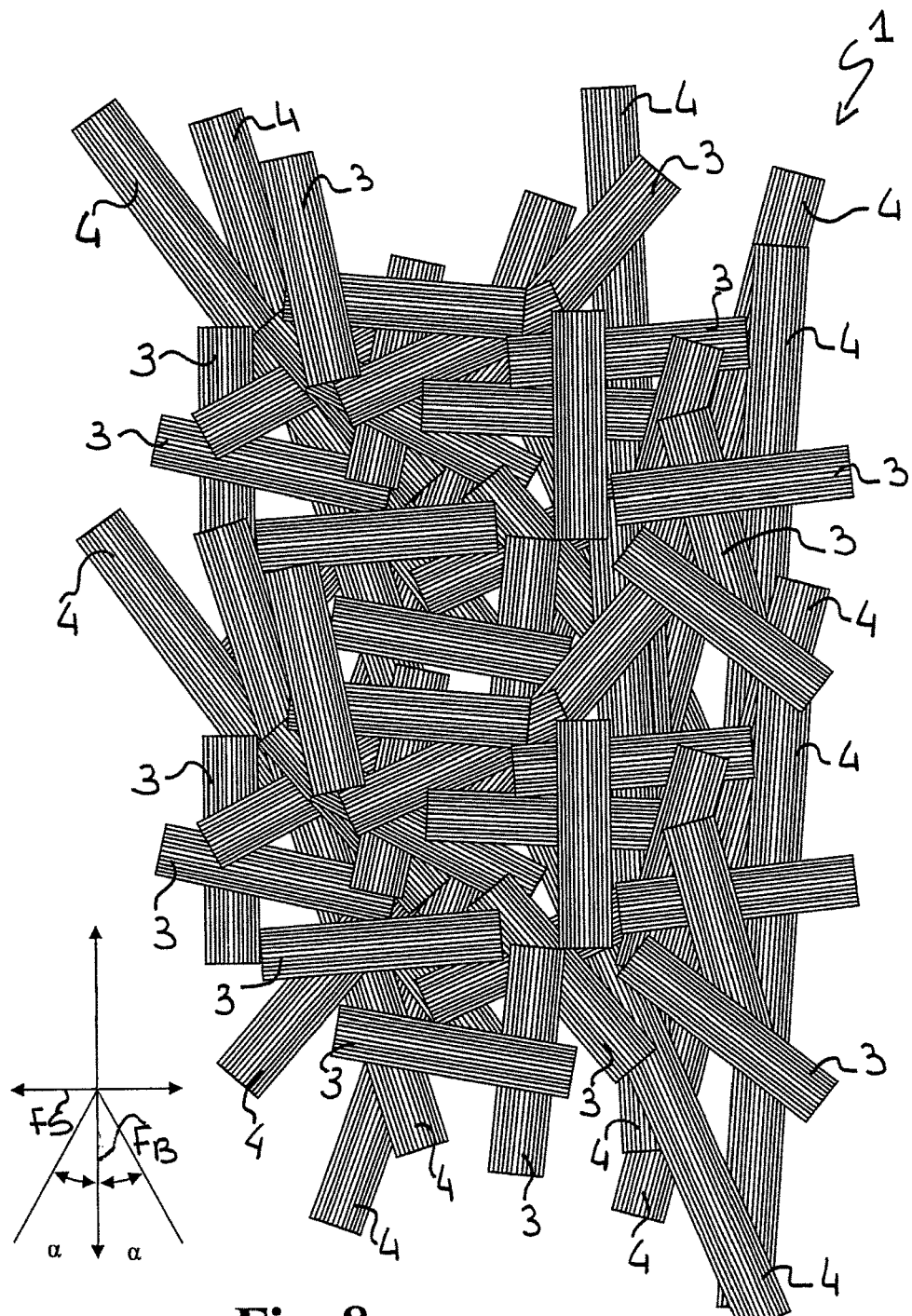
FIG. 8 shows a sheet moulding compound according to a second embodiment of the invention, in a plan view.
Figure 9:
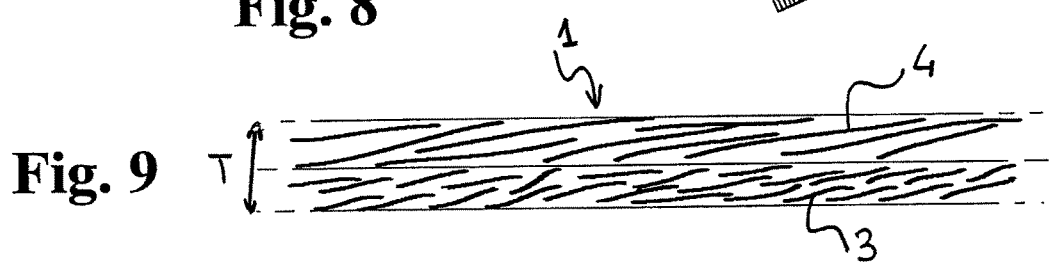
FIG. 9 is a longitudinal section view through the material of FIG. 8.

However, excellent characteristics of anisotropy coupled with good strength in every direction are also obtained with a sheet moulding compound 1 according to the embodiment of the invention shown in FIGS. 8 and 9. Such an embodiment differs from the one described above in detail in that the conglomerates 3 and 4 of the first and second groups are arranged according to superimposed layers, namely there is a separating plane between the conglomerates 3 of the first group and the conglomerates 4 of the second group. In this case the conglomerates 3 and 4 of the two groups can be identical, only being distinguishable by the plane to which they belong, besides by orientation. The advantage of this embodiment lies in the greater simplicity in making it, as shall be understood from hereinbelow the description of the manufacturing process.

Figure 10:
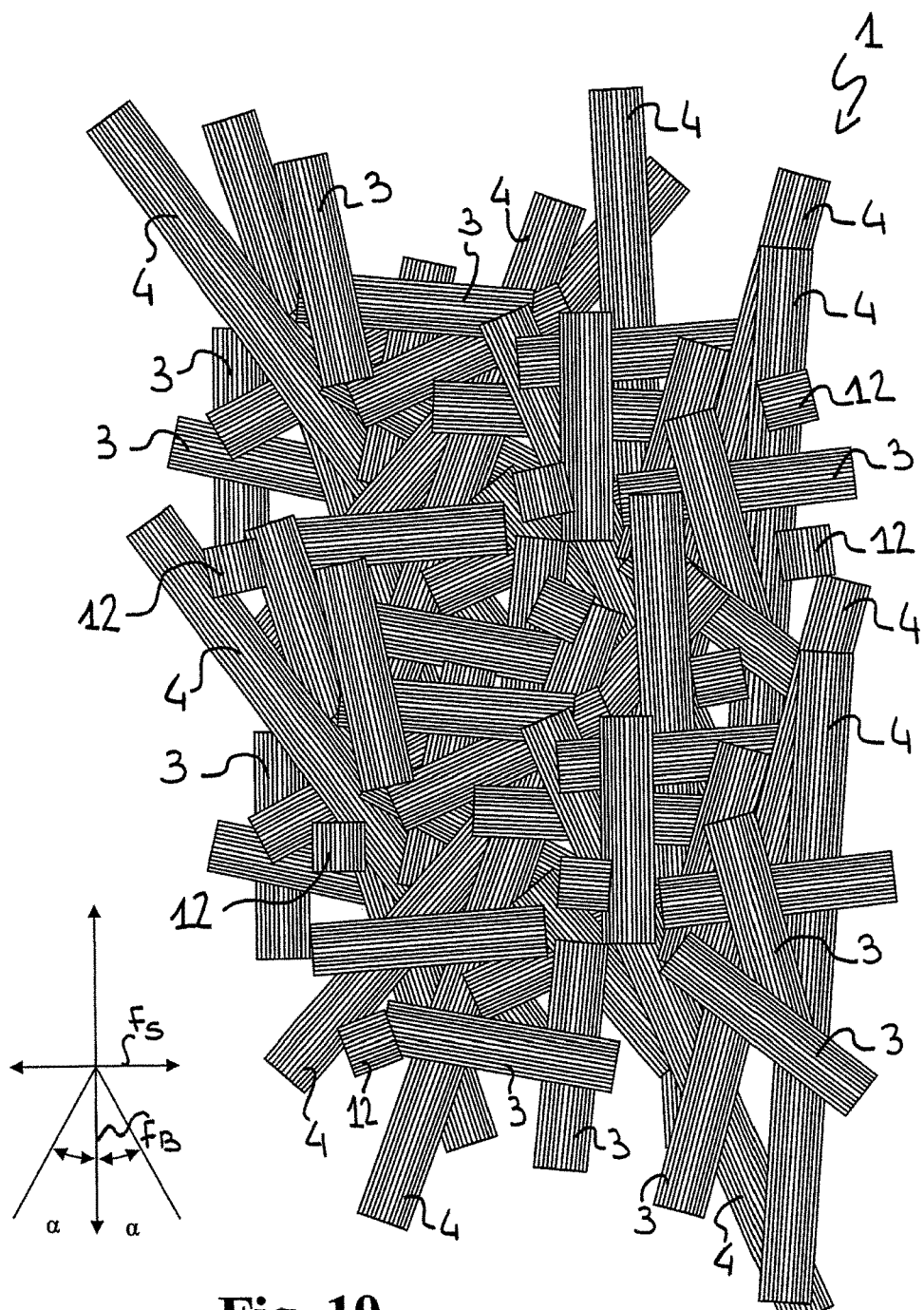
FIG. 10 shows a sheet moulding compound according to a third embodiment of the invention.
Figure 11:
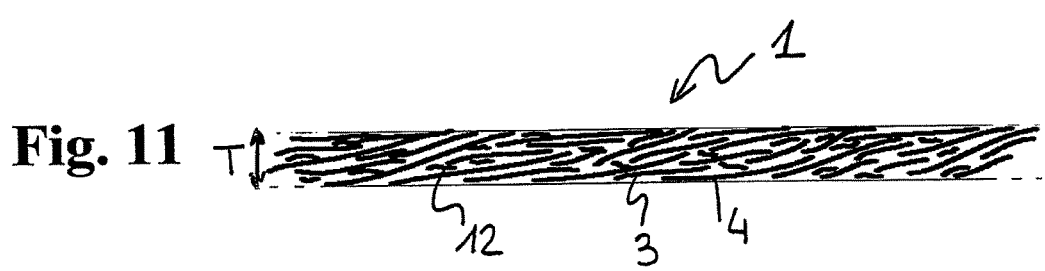
FIG. 11 is a longitudinal section view through the material of FIG. 10, FIGS. 12 and 13 are flow charts relating to a process for making a material according to the present invention, FIG. 14 schematically shows an installation for making a material according to the present invention.

FIGS. 10 and 11 show a sheet moulding compound 1 according to another embodiment of the present invention. In addition to the conglomerates 3 and 4 for which what has been stated with reference to the embodiments discussed above applies, the sheet moulding compound 1 comprises a third group of conglomerates 12 substantially randomly arranged. With reference also to FIG. 2, the conglomerates 12 of the third group preferably comprise unidirectional fibre and are preferably substantially square shaped, namely they have an aspect ratio L12/W12≤2/1, more preferably L12/W12=1/1. In particular, the conglomerates 12 of the third group have a length L12 and a width W12 preferably within the range 2-40 mm, more preferably 6-10 mm.

Also with three groups of conglomerates 3, 4, 12, the tensile strength in the direction FB remains different from that in the direction FS and in particular greater, even if their ratio changes.

The Applicant has observed that the closer the shape of the conglomerates gets to square, the simpler it is to randomly arrange them in the plane of the sheet moulding compound 1, since even by simply inserting them in a stirrer or letting them fall from a certain predetermined height the probability that they will be arranged in the plane with a certain orientation is equal to that of any other orientation. Vice-versa, the more the conglomerates are elongated, the easier it is to arrange them in an oriented manner, as shall be explained hereinafter.

According to other embodiments of a sheet moulding compound 1 according to the invention, not shown, there can be one or more additional groups of conglomerates with prevailing orientation of their direction FR of maximum strength according to a respective direction different from the direction FS of prevailing orientation of the conglomerates 4 of the second group. Such a sheet moulding compound 1 has anisotropic characteristics with two or more directions of high mechanical tensile strength, while still having a good mechanical tensile strength in every direction.

Figure 12:
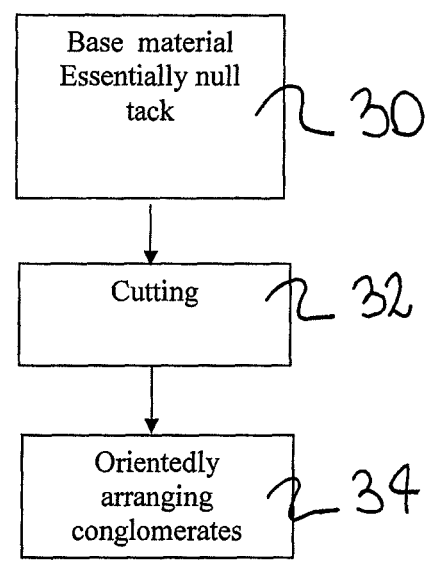

FIG. 12 illustrates a flow chart relating to a process for making a sheet moulding compound 1 according to the invention. The process comprises a first step 30 of providing at least one sheet of base material comprising unidirectional (or woven) fibre and a matrix of polymeric material. The sheet of base material is in a condition in which it has substantially zero tack, or in any case such as to allow cutting. Under tack, adhesiveness of the polymeric matrix material that allows the sheet of base material to stick to itself or to other objects is meant. The tack is inversely proportional to the viscosity of the polymeric matrix material, it can be chemically induced with tackifiers and it exists at temperatures above glass transition temperature.

The process then comprises a step 32 of cutting said at least one sheet of base material, so as to form the conglomerates 3, 4 of the first and second group and possibly the conglomerates 12 of the third group or of the additional groups. In the case of conglomerates distinct only by shape and/or size, they can be cut from a same sheet of base material, while in the case of conglomerates distinct by the nature of the fibre, or by the arrangement of the fibre, they shall be cut from respective sheets of base material.

The process then comprises a step 34 of randomly arranging the conglomerates 3 of the first group and the conglomerates 4 of the second group with prevailing orientation of their direction of maximum tensile strength FR along the direction FB, namely with orientation along the direction FB and within its angular range±α, as well as possibly of arranging the conglomerates 12 of the third group with random orientation of their direction of maximum tensile strength FR and/or the conglomerates of one or more additional groups with prevailing orientation of their direction of maximum tensile strength FR along a respective direction different from the direction FB, to obtain the sheet moulding compound 1 of the invention.

Figure 13:
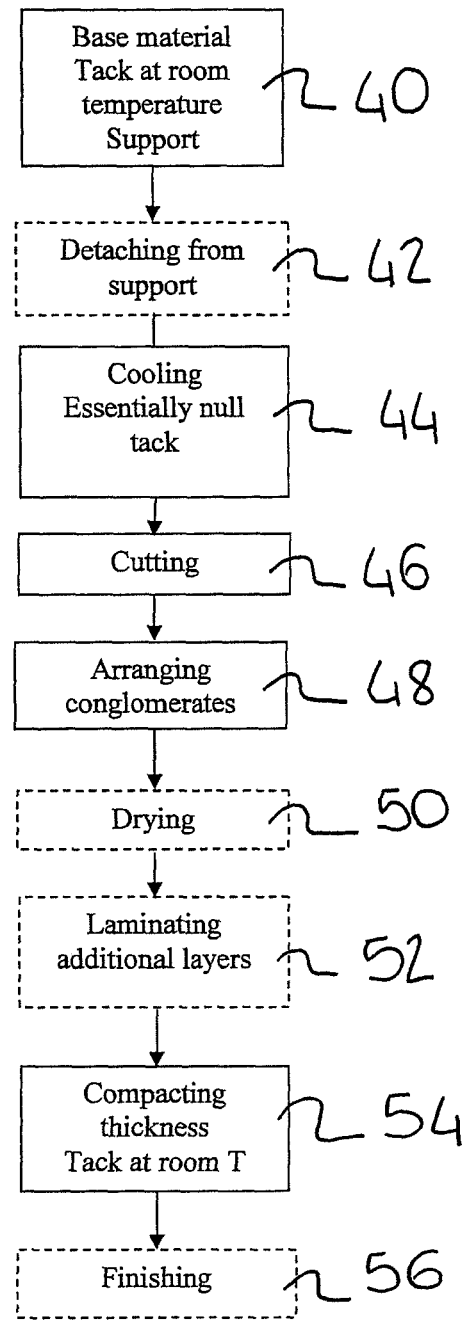

FIG. 13 illustrates a more detailed flow chart relating to the process for making a sheet moulding compound 1 according to the invention, described for the sake of briefness with reference to the case of only two groups of conglomerates 3, 4 distinct only by shape and/or size, able to be cut from a same sheet of base material. Those skilled in the art will easily understand the changes to be made to the process in the case of conglomerates cut from different sheets of base material, as in the case of conglomerates distinct by nature of the fibre, or by the arrangement of the fibre, as well as in the case of a greater number of groups of conglomerates.

The process comprises a step 40 of providing a sheet of base material comprising unidirectional (or woven) fibre and a matrix of polymeric material that has a tack at room temperature and supported onto a support sheet, for example consisting of silicon paper. Preferably, the matrix of the sheet of base material comprises at least one epoxy resin in a partially cured state.

In a subsequent step 42, the support sheet is detached from the base material.

A subsequent step 44 provides for cooling the sheet of base material until the substantial disappearance of tack.

A subsequent step 46 provides for cutting the sheet of base material according to the shapes and sizes of the conglomerates 3, 4 of the first and second groups, as well as in their desired numerical ratio.

A subsequent step 48 provides for arranging the conglomerates 3 of the first group randomly and the conglomerates 4 of the second group with prevailing orientation of their direction FR of maximum strength along the direction FS.

The process, preferably, but not necessarily, then provides for a step 50 of drying the arrangement of conglomerates 3, 4 to remove the excess humidity that may have accumulated.

In an optional step 52, one or more additional layers, for example of material of unidirectional fibre and matrix of polymeric material or polymeric material only, preferably the same as the polymeric material of the matrix of the conglomerates 3, 4 are placed over the arrangement of conglomerates 3, 4.

In a subsequent step 54 pressure is applied to the arrangement of conglomerates 3, 4 and to the possible additional layers—, for example with a heated calender, to compact the conglomerates 3, 4 together and obtain the desired thickness T.

Once the step 54 has finished, the arrangement of conglomerates 3, 4 of the sheet moulding compound 1 is at room temperature (20° C.), in which it has a tack.

It is also possible to provide for a step 56 of longitudinal cutting at the edges to obtain neat edges of the sheet moulding compound 1, and possibly of transversal cutting to obtain sheets of predetermined length L. In order to make it easier to cut in this step a cooled blade can be used or, if necessary, the sheet moulding compound 1 can be cooled.

The sheet moulding compound 1 can then be stored in the form of stacks of sheets of predetermined length L, or in the form of a roll, preferably under cooling at a temperature below room temperature to prevent premature curing of the polymeric matrix material.

Figure 14:
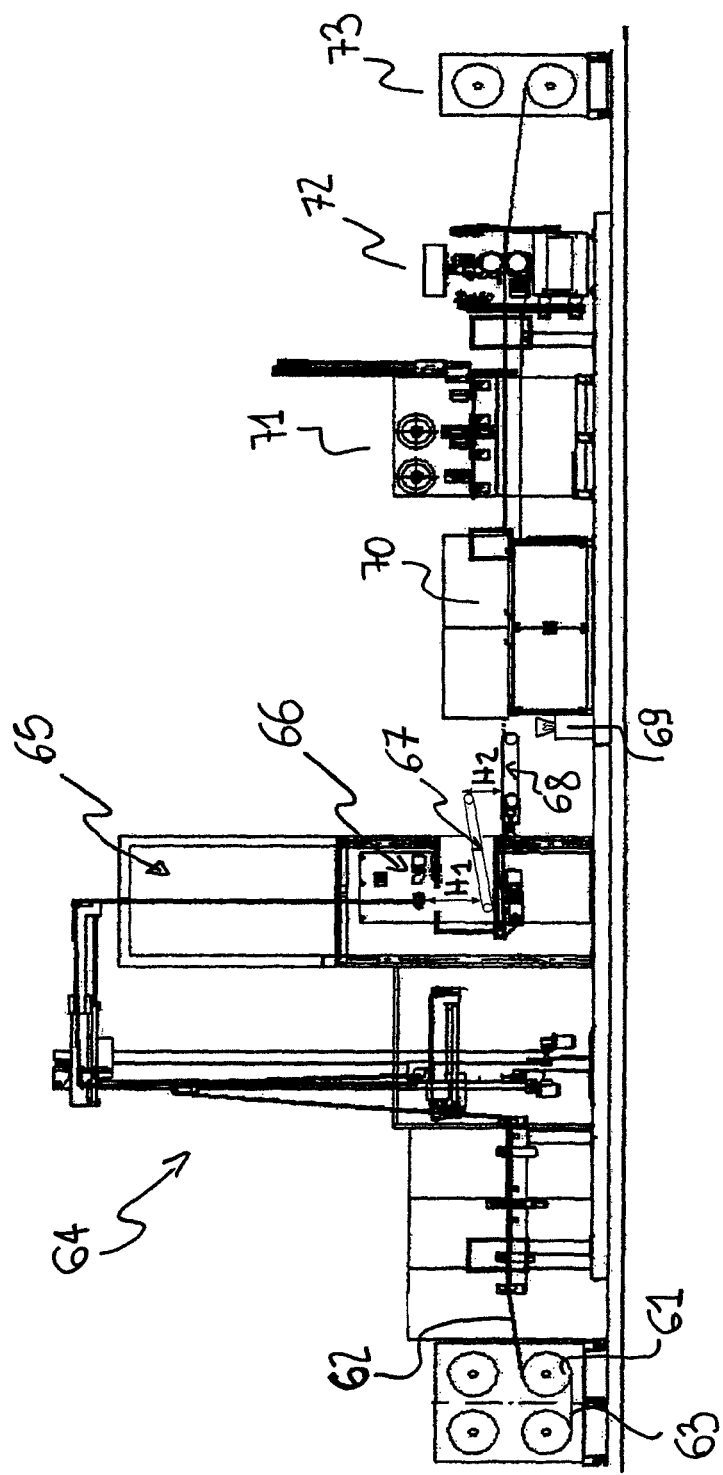

FIG. 14 schematically shows an installation 60 for making a sheet moulding compound 1 according to the invention. The installation 60 is also described for the sake of brevity with reference to the case of only two groups of conglomerates 3, 4 distinct only by shape and/or size, able to be cut from a same sheet of base material. Those skilled in the art will easily understand the changes to be made to the process in the case of conglomerates cut from different sheets of base material, as in the case of conglomerates distinct by nature of the fibre, or by the arrangement of the fibre, as well as in the case of a greater number of groups of conglomerates.

The installation 60 comprises an unwinding roller 61 of a sheet of base material 62, comprising unidirectional or woven fibre in a matrix of polymeric material 62. The sheet of base material 62, before being unwound from the unwinding roller 61, is supported onto a support sheet 63 of silicon paper and has a tack at room temperature. The sheets 62 and 63 are separate so that only the sheet of base material 62 proceeds along the installation, passing into a buffering station 64. In the buffering station 64 the sheet of base material 62 is arranged in coils to ensure a minimum workable amount during changing of the unwinding roller 61.

At the output of the buffering station 64 the sheet of base material 62 passes into a cooling station 65 where it is cooled until the tack of the polymeric matrix material is substantially nullified, or at least until it is made sufficiently low to allow the sheet of base material 62 to be cut. Preferably, the sheet of base material 62 is cooled down to a temperature $T \leq 0°$ C., more preferably $T \leq -10°$ C., and even more preferably $T \leq -15°$ C.

The cooled sheet of base material 62 passes into a cutting station 66 where it is kept preferably in a vertical position to undergo first cuts, preferably in the longitudinal direction, so as to form strips of base material. In the case of unidirectional fibre, the direction of the first cuts is preferably parallel to the direction of the fibres and the distance between the cuts is equal to the width W3, W4 of the conglomerates 3, 4. In this way, the direction FR of maximum tensile strength of the conglomerates 3, 4 coincides with the length direction of the conglomerates 3, 4.

In the cutting station 66, the strips cyclically undergo a second transversal cut at a distance from their end that is currently free equal to the length L3 to obtain conglomerates 3 of the first group, or, respectively, a third transversal cut at a distance from their end that is currently free equal to the length L4 to obtain the conglomerates 4 of the second group.

Preferably, in a cutting cycle in the station 66, a third transversal cut to obtain conglomerates 4 of the second group of the required length L4 is followed by two second transversal cuts to obtain conglomerates 3 of the third group of the required length L3. In this way, twice the number of conglomerates 3 of the first group is obtained compared to the conglomerates 4 of the second group.

Second and third oblique cuts with respect to the first cuts can be used to obtain rhomboidal conglomerates (FIG. 3), or shaped cuts can be used to obtain conglomerates of other shapes, for example those shown in FIGS. 4 and 5.

The conglomerates 3 and 4 of both groups fall freely from a predetermined height H1 onto a first conveyor belt 67, preferably from a height H1 less than or equal to 100 cm. In free fall, and through the effect of their length L3, L4, respectively, the conglomerates 3 of the first group are substantially randomly arranged, while the conglomerates 4 of the second group, being longer, do not have enough time to become oriented in every direction and preserve a prevailing orientation of their length direction L4, namely their direction FR of maximum tensile strength, along a predetermined direction FS.

The predetermined direction FS with respect to the first conveyor belt 67 is determined on one side by the direction of the first cuts, on the other side by the relative orientation between the band of base material 62 and the first conveyor belt 67. In the illustrated case of first longitudinal cuts of the base material and sliding direction of the first conveyor belt 67 perpendicular to the band of base material 62 in the cutting station 66, the predetermined direction FS corresponds to the longitudinal direction of the first conveyor belt 67.

The Applicant has observed that the lower the falling height H1 from the cutting station 66 to the first conveyor belt 67, the higher the degree of prevailing orientation of the conglomerates 4 on the first conveyor belt 67, i.e. the lower the angular range±α about the predetermined direction FB.

The first conveyor belt 67 takes the conglomerates 3 and 4 to a second falling height H2, preferably between 5 and 50 cm, from which it lets them fall onto a second conveyor belt 68.

In order to allow the first and/or second falling height H1, H2 to be adjusted, the first conveyor belt 67 is preferably hinged with an adjustable slope, and possibly able to translate horizontally with respect to the cutting station 66. Alternatively, the first conveyor belt 67 can be horizontal and supported at an adjustable height between the exit of the cutting station 66 and the second conveyor belt 68, for example supported on vertical rails.

The second conveyor belt 68 preferably has a slower speed than the first conveyor belt 67, so that the conglomerates 3, 4 have the time to lay in interpenetrating layers (FIG. 7), forming a sheet moulding compound 1 substantially without holes.

The adjustment of the speed of the first and/or second conveyor belt 67, 68, also with respect to the feeding speed of the base material 62 into the cutting station 66, also allows the thickness T of the sheet moulding compound 1 to be adjusted.

As an alternative or in addition to the different speed of the conveyor belts 67, 68, it is possible to provide that either of the first conveyor belt 67 and the second conveyor belt 68 is mobile with reciprocating motion, so as to lay the conglomerates in several layers.

In order to promote the interpenetration of the layers of the conglomerates 3 and 4 of the first and second groups, the cutting station 66 can cut in parallel different bands of a same base material or of different base materials.

It should also be understood that in this case, and/or providing for a conveyor belt 68 that can move with reciprocating motion, the first conveyor belt 67 can be omitted.

Moreover, the arrangement according to the two different orientations can be obtained if, the shape and size being equal, the conglomerates 3 of the first group are made from lighter fibre than the conglomerates 4 of the second group.

Furthermore, the arrangement according to the two different orientations can be obtained if, the shape, size and weight being equal, the conglomerates 3 of the first group are let fall from a greater height than the conglomerates 4 of the second group.

The installation 60 can comprise a device 69 for checking for the absence of holes, namely areas without conglomerates 3, 4, or at least holes larger than a predetermined maximum size. Such a device 69 can for example comprise an array of photoelectric cells arranged transversally to the second conveyor belt 68 and/or an array of load cells.

In the case of presence of holes larger than the predetermine maximum size, the checking device 69 can control the speed and/or the direction of motion of the first and/or second conveyor belt 67, 68, or interrupt production, activate an alarm, control a station for marking a portion of material to be discarded, for example through paint, etc.

Once it has received the desired density of conglomerates 3, 4, the second conveyor belt 68 enters into a drier 70, where the excess humidity is taken away.

At the exit of the drier 70 a heated calender 72 is arranged that compacts the patches together and sets the thickness T of the resulting sheet moulding compound 1.

The resulting sheet moulding compound 1 is then wound onto a winding roller in a winding station 73.

Between the drier 70 and the heated calender 72 there can be a station 71 for laying an additional layer, for example of material of unidirectional fibre and matrix of polymeric material, or polymeric material only, preferably the same as the polymeric material of the matrix of the conglomerates 3, 4.

Between the heated calender 72 and the winding station 73 there can also be a finishing station (not shown) arranged to make a longitudinal cut at the edges of the sheet moulding compound 1.

The finishing station can also be arranged to make transversal cuts to obtain sheets of predetermined length L, in which case the winding station 72 is replaced by a collecting station of the superimposed sheets.

Due to the residual tack, preferably such a finishing station will use cooled blades or a local cooling device of the sheet moulding compound 1.

Figure 15:
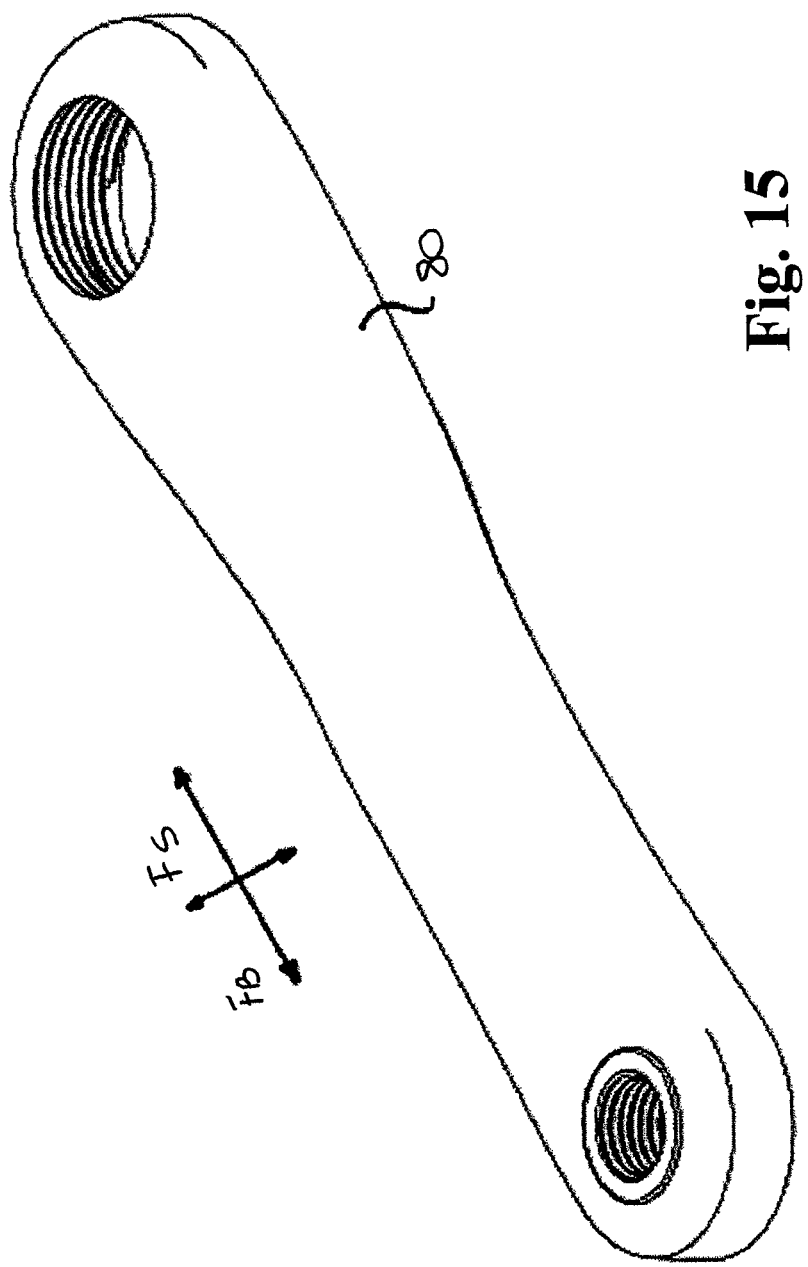
FIG. 15 is a perspective view of a bicycle component moulded from a material according to the present invention.

FIG. 15 shows an object of an elongated shape, in this specific case a bicycle crank 80, obtained by moulding from the sheet moulding compound 1 of the invention. The crank 80 is made by arranging several layers of the sheet moulding compound 1 so that the direction FB of the sheet moulding compound 1 corresponds to the longitudinal direction of the crank 80, which is the direction of greatest tensile stress of the crank 80. Along such a longitudinal direction, thanks to the conglomerates 4 of the second group, the mechanical tensile strength of the crank 80 is particularly high. The mechanical tensile strength is however good in all directions of the middle plane of the crank 80, since the minimum mechanical strength, in the transversal direction FS of the crank 80, is not zero thanks to the conglomerates 3 of the first group.

Figure 16:
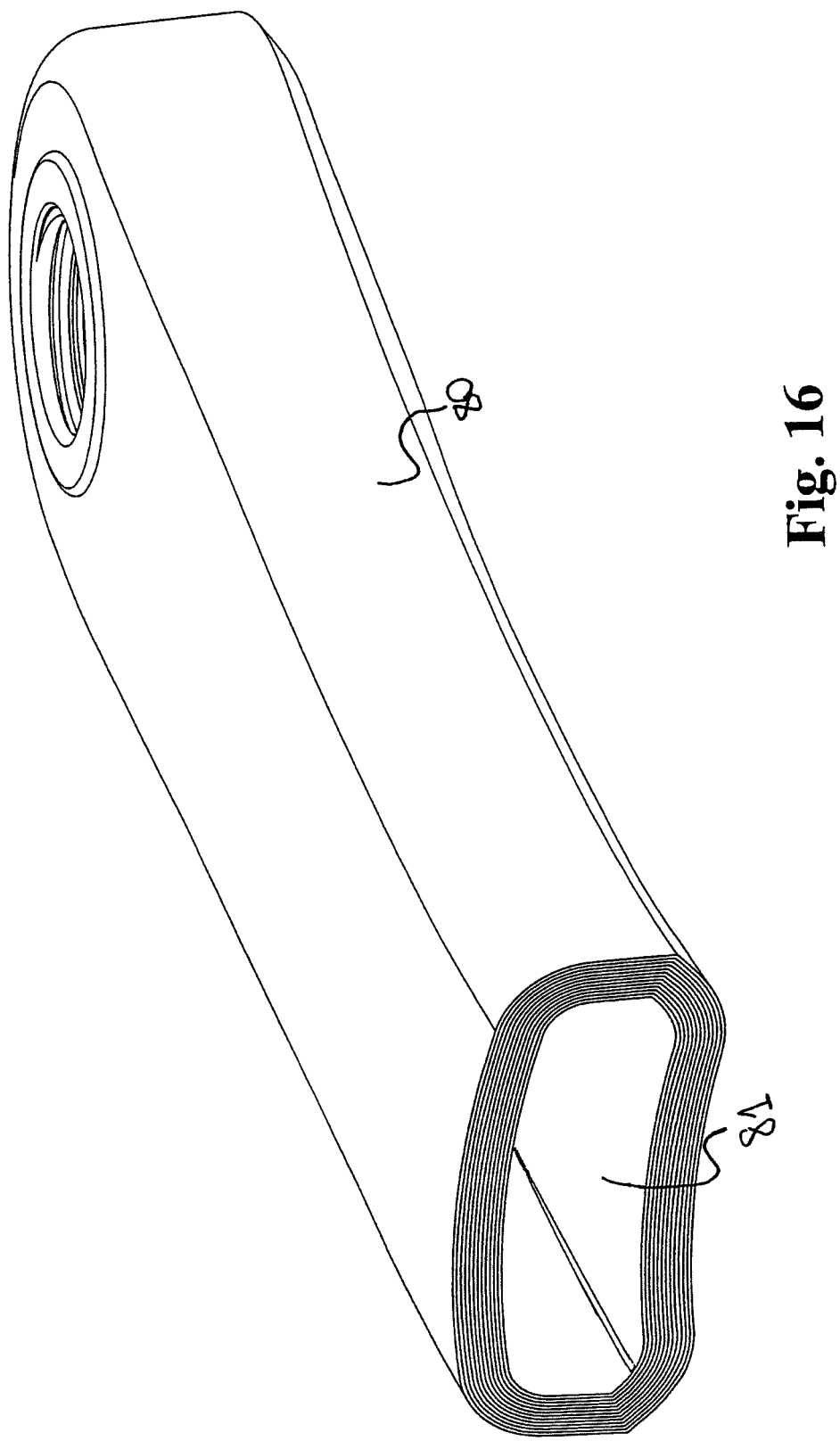
FIG. 16 is a partially sectioned perspective view of the component of FIG. 15.

In order to further improve the mechanical characteristics of the crank 80, the sheet moulding compound 1 can also be arranged in a roll in the mould, preferably around a core. In this case, as shown in FIG. 16, the rotation of the plane of the sheet moulding compound 1 provides good strength also in all directions of the transversal plane of the crank 80.

In order to decrease the weight of the crank 80, the core is preferably removable so as to create a crank 80 with a cavity 81.

The present invention can also have a particularly advantageous application as one of the layers of composite material used in other bicycle components, including components for gearshifts, rims, frame elements, control levers, etc.

The present invention in any case has advantageous application in all fields of application of compounds.

What is claimed is:

1. A moulding sheet comprising:
   conglomerates that are selected from a group consisting of a substantially two-dimensional patch of fibre segments in a matrix of polymeric material and a three-dimensional piece of fibre segments in a matrix of polymeric material that are arranged in a geometric plane having a width, a length, and a thickness that is negligible when compared to the width and the length;
   wherein a first group of the conglomerates has a random orientation of a direction of maximum tensile strength thereof in said geometric plane; and
   at least one second group of the conglomerates has a prevailing orientation of a direction of maximum tensile strength thereof along a predetermined direction in said geometric plane;
   said at least one second group of conglomerates being distinguishable from the first group of conglomerates by at least one characteristic other than orientation, and
   fibres of the fibre segments of the two-dimensional patch and the three-dimensional piece are selected from a group consisting of: carbon fibres, glass fibres, aramid fibres, ceramic fibres, boron fibres, or combinations thereof.

2. The moulding sheet according to claim 1, wherein each conglomerate comprises unidirectional fibres.

3. The moulding sheet according to claim 1, wherein said at least one distinguishing characteristic of the conglomerates of the second group compared to the conglomerates of the first group is selected from the group consisting of:
   nature of the fibre,
   shape of the conglomerates,
   size of the conglomerates,
   arrangement of the fibre segments within the conglomerates, and
   the fact that they are arranged in different layers parallel to the geometric plane.

4. The moulding sheet according to claim 1, wherein the density of the conglomerates of the first group is greater than the density of the conglomerates of the second group.

5. The moulding sheet according to claim 1, wherein the conglomerates of the first and second groups are arranged in interpenetrating layers.

6. The moulding sheet according to claim 1, wherein the conglomerates are substantially two-dimensional and rectangular.

7. The moulding sheet according to claim 1, wherein the first group comprises comparatively short conglomerates and the second group comprises comparatively long conglomerates.

8. The moulding sheet according to claim 1, wherein the conglomerates of the first group have a length/width ratio of less than or equal to 6.5/1 and the conglomerates of the second group have a length/width ratio of less than or equal to 20/1.

9. The moulding sheet according to claim 1, wherein the conglomerates of the first group have a length within the range 0.5-110 mm and the conglomerates of the second group have a length within the range 30-150 mm.

10. The moulding sheet according to claim 1, wherein the width of the conglomerates is within the range 2-50 mm.

11. The moulding sheet according to claim 1, wherein the moulding sheet further comprises a third group of conglomerates of fibre segments and a matrix of polymeric material, the conglomerates of the third group having a random orientation of a direction of maximum tensile strength thereof in said geometric plane, and being distinguishable from the first group of conglomerates by at least one characteristic other than orientation, the conglomerates of the third group having a length/width ratio equal to 1/1.

12. An object moulded from a moulding sheet according to claim 1, said moulded object having an elongated shape, the conglomerates of the second group being prevailingly oriented with their direction of maximum tensile strength according to the longitudinal direction of the moulded object.

13. The moulded object according to claim 12, wherein the object is a bicycle crank.

14. A moulding sheet, comprising:
   conglomerates that are selected from a group consisting of a substantially two-dimensional bundle of fibre segments in a matrix of polymeric material and a three-dimensional bundle of fibre segments in a matrix of polymeric material that are arranged in a geometric plane having a width, a length, and a thickness that is negligible when compared to the width and the length;
   wherein a first group of the conglomerates has a random orientation of a direction of maximum tensile strength thereof in said geometric plane, and
   at least one second group of the conglomerates has a prevailing orientation of a direction of maximum tensile strength thereof that extends along a predetermined direction in said geometric plane;
   said at least one second group of conglomerates being distinguishable from the first group of conglomerates by at least one characteristic other than orientation, and
   fibres of the fibre segments of the two-dimensional bundle and the three-dimensional bundle are selected from a group consisting of: carbon fibres, glass fibres, aramid fibres, ceramic fibres, boron fibres, or combinations thereof.

15. A moulding sheet, comprising:
   conglomerates of fibre segments in a matrix of polymeric material arranged in a geometric plane having a width, a length, and a thickness that is negligible when compared to the width and the length;
   wherein a first group of the conglomerates has a random orientation of a direction of maximum tensile strength thereof in said geometric plane; and
   at least one second group of the conglomerates has a direction of maximum tensile strength that extends within a predetermined angular range of ±40° with respect to a predetermined direction in the geometric plane;
   said at least one second group of conglomerates being distinguishable from the first group of conglomerates by at least one characteristic other than orientation, and
   fibres of the fibre segments are selected from a group consisting of: carbon fibres, glass fibres, aramid fibres, ceramic fibres, boron fibres, or combinations thereof.

* * * * *